United States Patent
Wang

(10) Patent No.: US 10,402,618 B2
(45) Date of Patent: Sep. 3, 2019

(54) FINGERPRINT IDENTIFICATION APPARATUS AND MANUFACTURING METHOD THEREOF, DISPLAY DEVICE

(71) Applicants: Boe Technology Group Co., Ltd., Beijing (CN); Beijing Boe Display Technology Co., Ltd., Beijing (CN)

(72) Inventor: Mingchao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/737,252

(22) PCT Filed: May 19, 2017

(86) PCT No.: PCT/CN2017/084991
§ 371 (c)(1),
(2) Date: Dec. 15, 2017

(87) PCT Pub. No.: WO2018/024020
PCT Pub. Date: Feb. 8, 2018

(65) Prior Publication Data
US 2018/0373918 A1    Dec. 27, 2018

(30) Foreign Application Priority Data

Aug. 1, 2016   (CN) .......................... 2016 1 0617225

(51) Int. Cl.
*G06K 9/00*    (2006.01)
(52) U.S. Cl.
CPC ........... *G06K 9/00013* (2013.01); *G06K 9/00* (2013.01); *G06K 9/0008* (2013.01)

(58) Field of Classification Search
CPC ........ C23F 1/00; G02B 26/005; C08F 138/00; C08F 138/02; C08F 238/00; C08F 2/44;
(Continued)

(56) References Cited

U.S. PATENT DOCUMENTS 6,565,727 B1 * 5/2003 Shenderov .......... B01F 13/0071
204/600
9,514,350 B2 * 12/2016 Wang .................... G06K 9/0002
(Continued)

FOREIGN PATENT DOCUMENTS

CN         1463674 A      6/1999
CN       103464070 A     12/2013
(Continued)

OTHER PUBLICATIONS

International Search Report and Written Opinion in PCT/CN2017/084991 dated Aug. 18, 2017, with English translation.

*Primary Examiner* — Avinash Yentrapati
(74) *Attorney, Agent, or Firm* — Womble Bond Dickinson (US) LLP

(57) ABSTRACT

The present disclosure provides a fingerprint identification apparatus and a manufacturing method thereof, as well as a display device comprising the fingerprint identification apparatus. The fingerprint identification apparatus comprises a plurality of identification elements, each comprising a first identification unit. The first identification unit comprises a first temperature sensitive hydrophilic/hydrophobic conversion layer, a lower electrode, a sealing layer, an electrically conductive droplet sandwiched between the first temperature sensitive hydrophilic-hydrophobic conversion layer and the lower electrode and enclosed by the sealing layer, and an upper electrode that is at least partially immersed in the electrically conductive droplet and is not in direct contact with the lower electrode.

20 Claims, 2 Drawing Sheets

(58) Field of Classification Search
CPC ......... C08F 2/32; C08L 49/00; C09D 149/00; G06K 9/0002; G06K 9/00087
See application file for complete search history.

(56) References Cited

U.S. PATENT DOCUMENTS

| | | | | |
|---|---|---|---|---|
| 9,519,132 | B2* | 12/2016 | Wang | G02B 26/005 |
| 9,921,404 | B1* | 3/2018 | Boon | G02B 26/005 |
| 10,048,486 | B1* | 8/2018 | Carneiro | G02B 26/005 |
| 2002/0166388 | A1* | 11/2002 | Ganapathi | G06K 9/0002 |
| | | | | 73/862.046 |
| 2005/0110051 | A1 | 5/2005 | Chou et al. | |
| 2007/0170059 | A1* | 7/2007 | Lee | B01L 3/502792 |
| | | | | 204/450 |
| 2008/0297878 | A1* | 12/2008 | Brown | B82Y 10/00 |
| | | | | 359/263 |
| 2010/0084542 | A1* | 4/2010 | Chou | H01L 27/14678 |
| | | | | 250/214 A |
| 2010/0208328 | A1* | 8/2010 | Heikenfeld | G02B 26/005 |
| | | | | 359/290 |
| 2011/0268151 | A1* | 11/2011 | Hadwen | B01L 3/502792 |
| | | | | 374/141 |
| 2013/0313491 | A1* | 11/2013 | Vilner | G02B 3/14 |
| | | | | 252/519.21 |
| 2015/0329656 | A1* | 11/2015 | Kim | C08F 138/00 |
| | | | | 524/547 |
| 2016/0274352 | A1* | 9/2016 | Wang | C23F 1/00 |
| 2016/0379573 | A1* | 12/2016 | de Greef | G09G 3/348 |
| | | | | 345/212 |
| 2017/0004779 | A1* | 1/2017 | Novoselov | G09G 3/2007 |
| 2017/0092173 | A1* | 3/2017 | de Greef | G02B 26/005 |
| 2017/0092203 | A1* | 3/2017 | Ramos Carneiro | G02B 26/005 |
| 2017/0184839 | A1* | 6/2017 | Tigelaar | G02B 26/005 |

FOREIGN PATENT DOCUMENTS

| | | |
|---|---|---|
| CN | 103470852 A | 12/2013 |
| CN | 106250849 A | 12/2016 |

* cited by examiner

FINGERPRINT IDENTIFICATION APPARATUS AND MANUFACTURING METHOD THEREOF, DISPLAY DEVICE

RELATED APPLICATION

This application is the U.S. national phase entry of PCT/CN2017/084991, with an international filing date of May 19, 2017, which claims priority to the Chinese patent application No. 201610617225.0 filed on Aug. 1, 2016, the entirety of which is incorporated herein by reference.

FIELD

The present disclosure generally relates to the fingerprint identification field. Particularly, the present disclosure relates a fingerprint identification apparatus and a manufacturing method thereof, as well as a display device comprising the fingerprint identification apparatus.

BACKGROUND

With the development of modern society, the importance of personal identification and personal information security has gained increasing attention. Since a human fingerprint is unique and invariable, the fingerprint identification technology is highly safe and reliable and easy and convenient to use, and is widely used in various fields for protecting safety of personal information, including the field of display, especially the field of electronic devices having a display function, such as mobile phones, laptop computers, tablet computers, digital cameras, etc. A fingerprint identification function has already become one of the essential functions of current electronic devices, and it is greatly significant for enhancing safety and extending the range of application of electronic devices.

Hence, there is a need in the art for providing an improved fingerprint identification apparatus.

SUMMARY

According to an aspect of the present disclosure, a fingerprint identification apparatus is provided, which comprises a plurality of identification elements, each of the plurality of identification elements comprising a first identification unit. The first identification unit comprises a first temperature sensitive hydrophilic-hydrophobic conversion layer, a lower electrode, a sealing layer, an electrically conductive droplet sandwiched between the first temperature sensitive hydrophilic-hydrophobic conversion layer and the lower electrode and enclosed by the sealing layer, and an upper electrode that is at least partially immersed in the electrically conductive droplet and is not in direct contact with the lower electrode. The first identification units are configured in such a way that when an ambient temperature is lower than a temperature of a ridge of a finger, in a first identification unit contacting the ridge of the finger, the first temperature sensitive hydrophilic-hydrophobic conversion layer converts from being hydrophilic into being hydrophobic, and the upper electrode is electrically coupled to the lower electrode via the first temperature sensitive hydrophilic-hydrophobic conversion layer; in a first identification unit contacting a valley of the finger, the first temperature sensitive hydrophilic-hydrophobic conversion layer remains to be hydrophilic, and the upper electrode is electrically isolated from the lower electrode.

In some embodiments, each identification element further comprises a second identification unit. The second identification unit comprises a second temperature sensitive hydrophilic-hydrophobic conversion layer, a lower electrode, the sealing layer, an electrically conductive droplet sandwiched between the second temperature sensitive hydrophilic-hydrophobic conversion layer and the lower electrode and enclosed by the sealing layer, and an upper electrode that is at least partially immersed in the electrically conductive droplet and is not in direct contact with the lower electrode. The second identification units are configured in such a way that when the ambient temperature is higher than the temperature of the ridge of the finger, in a second identification unit contacting the valley of the finger, the second temperature sensitive hydrophilic-hydrophobic conversion layer converts from being hydrophilic into being hydrophobic, and the upper electrode is electrically coupled to the lower electrode; in a second identification unit contacting the ridge of the finger, the second temperature sensitive hydrophilic-hydrophobic conversion layer remains to be hydrophilic, and the upper electrode is electrically isolated from the lower electrode.

In some embodiments, a hydrophilic-hydrophobic conversion temperature of the first temperature sensitive hydrophilic-hydrophobic conversion layer is $T1$, and a hydrophilic-hydrophobic conversion temperature of the second temperature sensitive hydrophilic-hydrophobic conversion layer is $T2$, the temperature of the ridge of the finger is $T$, an absolute value of a difference between temperatures of the ridge and valley of the finger is $\tau$, and $T-\tau<T1<T<T2<T+\tau$.

Under normal conditions, the temperature of the ridge of the finger is a fixed value and the absolute value of the difference between temperatures of the ridge and valley of the finger is also a fixed value. For example, the temperature of the ridge of the finger is 37° C., and the absolute value of the difference between temperatures of the ridge and valley of the finger is 0.1° C.

In some embodiments, when the first temperature sensitive hydrophilic-hydrophobic conversion layer and/or the second temperature sensitive hydrophilic-hydrophobic conversion layer converts from being hydrophilic into being hydrophobic, a contact angle with the electrically conductive droplet increases from a range of 0°-60° to a range of 100°-150°.

In some embodiments, the first temperature sensitive hydrophilic-hydrophobic conversion layer and/or the second temperature sensitive hydrophilic-hydrophobic conversion layer comprise a substrate and a cross-linking grafting film on the substrate.

In some embodiments, the substrate has a plurality of grooves.

In some embodiments, the grooves have a spacing smaller than or equal to 10 μm.

In some embodiments, the cross-linking grafting film of the first temperature sensitive hydrophilic-hydrophobic conversion layer comprises polyisopropylacrylamide.

In some embodiments, the cross-linking grafting film of the second temperature sensitive hydrophilic-hydrophobic conversion layer comprises a copolymer of N-ethyl acrylamide and N-isopropylacrylamide.

In some embodiments, the sealing layer is a hydrophobic sealing layer.

In some embodiments, the sealing layer is made of polymethyl methacrylate.

In some embodiments, the fingerprint identification apparatus further comprises a signal processing circuit, each identification element being electrically coupled to the signal processing circuit. The signal processing circuit is configured to detect electrical signals on lower electrodes of the first identification unit and the second identification unit and to determine fingerprints according to the detected electrical signals.

In some embodiments, the fingerprint identification apparatus further comprises a heat conducting layer arranged above the identification elements.

In some embodiments, the heat conducting layer is a longitudinal heat conducting layer In some embodiments, the heat conducting layer is made of a carbon nanotube composite.

In some embodiments, the heat conducting layer has a plurality of parallel cylindrical units, each of the plurality of parallel cylindrical units extending in a direction perpendicular to a contact interface between the finger and the fingerprint identification apparatus.

In some embodiments, the fingerprint identification apparatus further comprises a protection layer arranged above the heat conducting layer.

According to another aspect of the present disclosure, a display device is provided, which comprises the above-described fingerprint identification apparatus.

According to still another aspect of the present disclosure, a method for manufacturing a fingerprint identification apparatus is provided. The method comprises: providing a plurality of identification elements, each of the plurality of identification elements comprising a first identification unit and a second identification unit. The first identification unit comprises an electrically conductive droplet sandwiched between a first temperature sensitive hydrophilic-hydrophobic conversion layer and a lower electrode and enclosed by a sealing layer, and the second identification unit comprises an electrically conductive droplet sandwiched between a second temperature sensitive hydrophilic-hydrophobic conversion layer and a lower electrode and enclosed by the sealing layer. Upper electrodes of the first identification unit and the second identification unit are at least partially immersed in the electrically conductive droplets and are not in contact with the corresponding lower electrodes.

In some embodiments, the first temperature sensitive hydrophilic-hydrophobic conversion layer and/or the second temperature sensitive hydrophilic-hydrophobic conversion layer are formed by the steps of providing a substrate; forming a cross-linking grafting film on the substrate.

In some embodiments, a plurality of grooves are formed by patterning on a surface of the substrate formed with the cross-linking grafting film.

It is to be noted that these aspects of the present disclosure have the same or similar exemplary implementations and benefits, which will not be elaborated herein.

These and other aspects of the present disclosure will become apparent from the embodiments described below and will be set forth with reference to the embodiments described below.

DETAILED DESCRIPTION

Figure 1A:
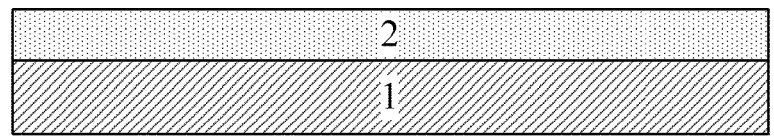
FIGS. 1(a) and 1(b) schematically illustrate contact angles with an electrically conductive droplet when a temperature sensitive hydrophilic-hydrophobic conversion layer exhibits hydrophilicity and hydrophobicity, respectively.

Exemplary embodiments of the present disclosure will be described in detail below with reference to the drawings. The drawings are schematic and are not drawn to scale, and they only intend to illustrate the embodiments of the present disclosure rather than limiting the protection scope of the present disclosure. In the drawings, the same reference signs represent the same or similar parts. In order to make the technical solution of the present disclosure clearer, technological steps and devices known in the art are omitted herein.

Figure 1B:
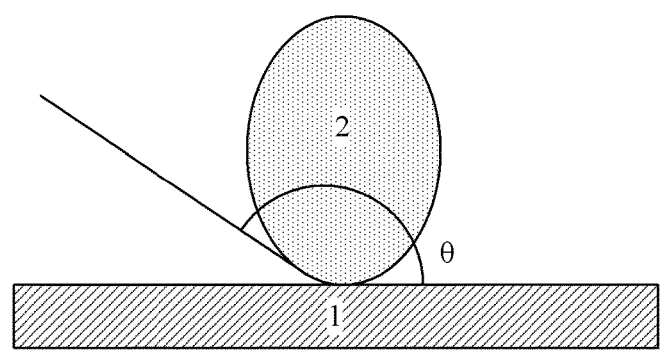

FIGS. 1(a) and 1(b) schematically illustrate contact angles with an electrically conductive droplet when a temperature sensitive hydrophilic-hydrophobic conversion layer exhibits hydrophilicity and hydrophobicity, respectively. The term "contact angle", as used herein, refers to the angle θ between a tangent of a gas-liquid interface made at the intersection of gas, liquid and solid to pass through the liquid and a solid-liquid boundary line. As shown in FIG. 1(a), a molecular chain of a material of a temperature sensitive hydrophilic-hydrophobic conversion layer 1 exhibits hydrophilicity, in which case, a contact angle between a electrically conductive droplet 2 and the temperature sensitive hydrophilic-hydrophobic conversion layer 1 is close to 0°, and the electrically conductive droplet 2 contact the temperature sensitive hydrophilic-hydrophobic conversion layer 1 with a largest possible area, i.e. the electrically conductive droplet 2 is spread on the temperature sensitive hydrophilic-hydrophobic conversion layer 1. As shown in FIG. 1(b), the molecular chain of the material of the temperature sensitive hydrophilic-hydrophobic conversion layer 1 exhibits hydrophobicity, in which case, a contact angle θ between electrically conductive droplet 2 and the temperature sensitive hydrophilic-hydrophobic conversion layer 1 is approximately 150°, and the electrically conductive droplet 2 contact the temperature sensitive hydrophilic-hydrophobic conversion layer 1 with a smallest possible area.

Figure 2:
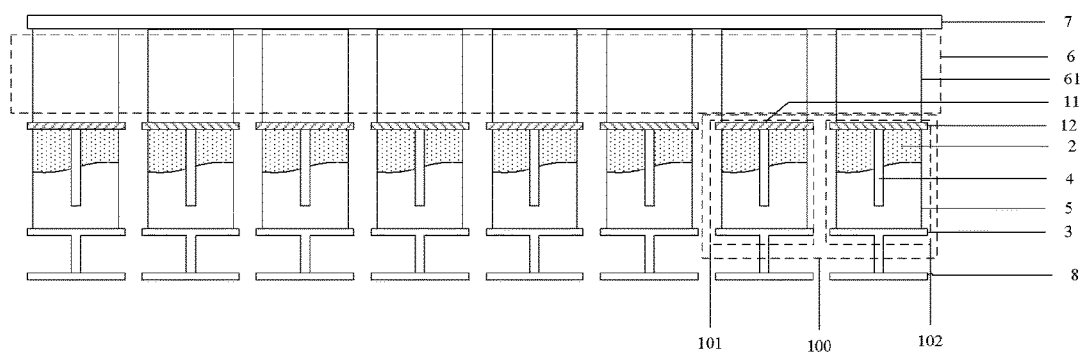
FIG. 2 illustrates a structural diagram of a fingerprint identification apparatus according to an embodiment of the present disclosure.

FIG. 2 illustrates a structural diagram of a fingerprint identification apparatus according to an embodiment of the present disclosure. As shown in FIG. 2, the fingerprint identification apparatus comprises a plurality of identification elements 100, each of the plurality of identification elements 100 comprising a first identification unit 101 and a second identification unit 102. The first identification unit 101 comprises an electrically conductive droplet 2 sandwiched between a first temperature sensitive hydrophilic-hydrophobic conversion layer 11 and a lower electrode 3 and enclosed by a sealing layer 5, and the second identification unit 102 comprises an electrically conductive droplet 2 sandwiched between the second temperature sensitive hydrophilic-hydrophobic conversion layer 12 and the lower electrode 3 and enclosed by the sealing layer 5. Upper electrodes 4 of the first identification unit 101 and the second identification unit 102 are at least partially immersed in the electrically conductive droplets 2 and are not in direct contact with the lower electrodes 3. The first identification units 101 are configured in such a way that when an ambient temperature is lower than a temperature of a ridge of a finger, in a first identification unit 101 contacting the ridge of the finger, the first temperature sensitive hydrophilic-hydrophobic conversion layer 11 converts from being hydrophilic into being hydrophobic, and the upper electrode 4 is electrically coupled to the lower electrode 3 via the first temperature sensitive hydrophilic-hydrophobic conversion layer 11; in a first identification unit 101 contacting a valley of the finger, the first temperature sensitive hydrophilic-hydrophobic conversion layer 11 remains to be hydrophilic, and the upper electrode 4 is electrically isolated from the lower electrode 3. The second identification units 102 are configured in such a way that when the ambient temperature is higher than the temperature of the ridge of the finger, in a second identification unit 102 contacting the valley of the finger, the second temperature sensitive hydrophilic-hydrophobic conversion layer 12 converts from being hydrophilic into being hydrophobic, and the upper electrode 4 is electrically coupled to the lower electrode 3; in a second identification unit 102 contacting the ridge of the finger, the second temperature sensitive hydrophilic-hydrophobic conversion layer 12 remains to be hydrophilic, and the upper electrode 4 is electrically isolated from the lower electrode 3.

The term "temperature sensitive hydrophilic-hydrophobic conversion layer" used herein refers to a layer made of a material having a property that, when a temperature of the material is lower than a critical conversion temperature, a molecular chain of the material presents hydrophilicity, in which case, a contact angle between a liquid and the material is very small, and the liquid contacts as large area of the material as possible; when the temperature of the material is higher than the critical conversion temperature, the molecular chain of the material presents hydrophobicity, in which case, the contact angle between the liquid and the material is very large, and the liquid contact as small area of the material as possible. Accordingly, by changing the temperature of the temperature sensitive hydrophilic-hydrophobic conversion layer, the layer can be changed from being hydrophilic into being hydrophobic, or be changed from being hydrophobic into being hydrophilic. In this disclosure, the critical conversion temperatures of the first temperature sensitive hydrophilic-hydrophobic conversion layer and the second temperature sensitive hydrophilic-hydrophobic conversion layer are different.

During operation, electrical signals are applied to the upper electrodes of the identification element. When a temperature of the first temperature sensitive hydrophilic-hydrophobic conversion layer is below a corresponding critical conversion temperature, the first temperature sensitive hydrophilic-hydrophobic conversion layer exhibits a hydrophilic state, the electrically conductive droplet contacts as large area of the first temperature sensitive hydrophilic-hydrophobic conversion layer as possible, and the upper electrode is not electrically coupled to the lower electrode, so no electrical signal is transferred from the upper electrode to the lower electrode; when the temperature of the first temperature sensitive hydrophilic-hydrophobic conversion layer is above the corresponding critical conversion temperature, the first temperature sensitive hydrophilic-hydrophobic conversion layer exhibits a hydrophobic state, the electrically conductive droplet contacts as small area of the first temperature sensitive hydrophilic-hydrophobic conversion layer as possible, so the upper electrode is electrically coupled to the lower electrode via the electrically conductive droplet and electrical signals are transferred from the upper electrode to the lower electrode as a result. By detecting electrical signals on the lower electrodes, a temperature profile of the first temperature sensitive hydrophilic-hydrophobic conversion layer can be determined. As for the second temperature sensitive hydrophilic-hydrophobic conversion layer, the situation is similar.

It is to be appreciated that the first identification unit functions when the ambient temperature is lower than the temperature of the ridge of the finger, while the second identification unit functions when the ambient temperature is higher than the temperature of the ridge of the finger. The ambient temperature will be usually lower than the temperature of the ridge of the finger under normal conditions, so a fingerprint identification apparatus comprising only the first identification unit without the second identification unit is applicable in most cases. Particularly, when the fingerprint identification apparatus is used in a hot environment (i.e. the ambient temperature is higher than the temperature of the ridge of the finger), by making each identification element comprise the second identification unit, the fingerprint identification apparatus can well realize the fingerprint identification function.

In above fingerprint identification apparatus, fingerprints are detected by means of the property that the hydrophilicity and hydrophobicity of a temperature sensitive hydrophilic-hydrophobic conversion layer is related to the temperature, so the defect that a capacitive fingerprint identification apparatus cannot detect fingerprints through a glass plate on a surface of a display device is overcome. The fingerprint identification apparatus can be integrated in any position of the display device without the need to provide a separate fingerprint identification region on an edge of the display device, thereby improving accuracy of fingerprint identification and realizing narrow frame and miniaturization of the display device.

It is to be noted that, although FIG. 2 shows the identification element 100 comprising both the first identification unit 101 and the second identification unit 102, in some embodiments, the identification element 100 may comprise only the first identification unit 101 but not the second identification unit 102. As mentioned previously, the first identification unit functions when the ambient temperature is lower than the temperature of the ridge of the finger, while the second identification unit functions when the ambient temperature is higher than the temperature of the ridge of the finger. The ambient temperature will be usually lower than the temperature of the ridge of the human finger under normal conditions, so a fingerprint identification apparatus comprising only the first identification unit without the second identification unit is applicable in most cases. Particularly, when the fingerprint identification apparatus is used in a hot environment (i.e. the ambient temperature is higher than the temperature of the ridge of the finger), by making each identification element comprise the second identification unit, the fingerprint identification apparatus can well realize the fingerprint identification function.

It is also to be noted that, the distribution of the electrically conductive droplets 2 as shown in FIG. 2 is schematic, and is only for the purpose of illustration. As will be explained below, the distribution of the electrically conductive droplets 2 varies with the temperatures of the first and/or second temperature sensitive hydrophilic-hydrophobic conversion layers 11, 12. In addition, it shall be pointed out that the number of identification elements 100 as shown in FIG. 2 is schematic. Given the teaching of the present disclosure, those skilled in the art can choose appropriate number and density of the identification elements according to the actual needs.

A hydrophilic-hydrophobic conversion temperature of the first temperature sensitive hydrophilic-hydrophobic conversion layer 11 is T1, and a hydrophilic-hydrophobic conversion temperature of the second temperature sensitive hydrophilic-hydrophobic conversion layer 12 is T2, a temperature of the ridge of the finger is T, an absolute value of a difference between temperatures of the ridge and valley of the finger is τ, and T−τ<T1<T<T2<T+τ. Under normal conditions, the temperature of the ridge of the finger is a fixed value and the absolute value of the difference between temperatures of the ridge and valley of the finger τ is also a fixed value.

When the ambient temperature is lower than the temperature of the ridge of the finger, the temperature of the ridge of the finger is higher than the temperature of the valley of the finger. In this case, when the finger contacts the fingerprint identification apparatus, the first temperature sensitive hydrophilic-hydrophobic conversion layer in the first identification unit of the identification element contacting the ridge of the finger converts from being hydrophilic into being hydrophobic, so electrical signals are detected on the corresponding lower electrode; the first temperature sensitive hydrophilic-hydrophobic conversion layer in the first identification unit of the identification element contacting the valley of the finger remains to be hydrophilic, so no electrical signal is detected on the corresponding lower electrode. Meanwhile, the second temperature sensitive hydrophilic-hydrophobic conversion layer in the second identification unit remains to be hydrophilic, so no electrical signal is detected on the corresponding lower electrode. When the ambient temperature is higher than the temperature of the ridge of the finger, the temperature of the ridge of the finger is lower than the temperature of the valley of the finger. In this case, when the finger contacts the fingerprint identification apparatus, the second temperature sensitive hydrophilic-hydrophobic conversion layer in the second identification unit of the identification element contacting the valley of the finger converts from being hydrophilic into being hydrophobic, so electrical signals are detected on the corresponding lower electrode; the second temperature sensitive hydrophilic-hydrophobic conversion layer in the second identification unit of the identification element contacting the ridge of the finger remains to be hydrophilic, so no electrical signal is detected on the corresponding lower electrode. Meanwhile, the first temperature sensitive hydrophilic-hydrophobic conversion layer in the first identification unit remains to be hydrophobic, so electrical signals are detected on the corresponding lower electrode.

As a result, by detecting presence and absence of electrical signals on the lower electrodes of the first identification unit and the second identification unit in each identification element, it can be determined whether a fingerprint feature contacting the identification element is a ridge or a valley, thereby realizing fingerprint identification. Specifically, when electrical signals are present or absent on the lower electrodes of both the first identification unit and the second identification unit, the valley of the fingerprint is detected. On the contrary, when electrical signals are present on the lower electrode of the first identification unit but absent on the lower electrode of the second identification unit, the ridge of the fingerprint is detected.

The first temperature sensitive hydrophilic-hydrophobic conversion layer 11 and/or the second temperature sensitive hydrophilic-hydrophobic conversion layer 12 comprise a substrate and a cross-linking grafting film on the substrate. The substrate has a plurality of grooves, and the grooves have a spacing smaller than or equal to 10 μm therebetween. A critical conversion temperature of the cross-linking grafting film on the substrate is related to roughness of the substrate. Thus the roughness of the substrate can be controlled by forming a plurality of grooves on the substrate, thereby regulating the critical conversion temperatures of the first and/or second temperature sensitive hydrophilic-hydrophobic conversion layers 11, 12.

The cross-linking grafting film of the first temperature sensitive hydrophilic-hydrophobic conversion layer 11 comprises polyisopropylacrylamide. A critical conversion temperature of the polyisopropylacrylamide is around 35° C., and can be further regulated by adjusting the roughness of the substrate. Experimental results show that when hydrophobicity is exhibited, a contact angle between the polyisopropylacrylamide and a liquid is close to 160°, and when hydrophilicity is exhibited, the contact angle between the polyisopropylacrylamide and a liquid is close to 0°.

The cross-linking grafting film of the second temperature sensitive hydrophilic-hydrophobic conversion layer 12 comprises a copolymer of N-ethyl acrylamide and N-isopropylacrylamide. By controlling mol percentages of N-ethyl acrylamide and N-isopropylacrylamide in the copolymer, a critical conversion temperature of the copolymer can be controlled. Experimental results show that a critical conversion temperature of a typical copolymer of N-ethyl acrylamide and N-isopropylacrylamide is within a range of 33.8° C.-41.6° C., e.g. 36.8° C.

In an exemplary embodiment, when the first temperature sensitive hydrophilic-hydrophobic conversion layer and/or the second temperature sensitive hydrophilic-hydrophobic conversion layer converts from being hydrophilic into being hydrophobic, a contact angle with the electrically conductive droplet increases from a range of 0°-60° to a range of 100°-150°. When the contact angle between the first and/or second temperature sensitive hydrophilic-hydrophobic conversion layer and the electrically conductive droplet is 0°-60°, the electrically conductive droplet is spread on the first and/or second temperature sensitive hydrophilic-hydrophobic conversion layer, so that the upper electrode is not electrically coupled to the lower electrode. When the contact angle between the first and/or second temperature sensitive hydrophilic-hydrophobic conversion layer and the electrically conductive droplet is 100°-150°, since the electrically conductive droplet has a constant volume and contacts the first and/or second temperature sensitive hydrophilic-hydrophobic conversion layer with a tiny contact area, the electrically conductive droplet is in an elongated shape, thereby transferring electrical signals of the upper electrode to the lower electrode.

The sealing layer is a hydrophobic sealing layer, which is made, for example, of polymethyl methacrylate. By using the hydrophobic sealing layer, interference caused by sidewalls of the identification element to the distribution of the electrically conductive droplets 2 can be minimized, so that the distribution of the electrically conductive droplets 2 is only influenced by hydrophilicity and hydrophobicity of the first and/or second temperature sensitive hydrophilic-hydrophobic conversion layers 11, 12.

Optionally, the fingerprint identification apparatus further comprises a signal processing circuit 8, each identification element 100 being electrically coupled to the signal processing circuit 8. The signal processing circuit 8 is configured to detect electrical signals on lower electrodes 4 of the first identification unit 101 and the second identification unit 102 and to determine fingerprints according to the detected electrical signals.

Optionally, the fingerprint identification apparatus further comprises a heat conducting layer 6 arranged above the identification elements 100. The heat conducting layer 6 can fully conduct heat on the finger to the plurality of identification elements 100, thereby increasing sensitivity and accuracy of fingerprint identification.

In an exemplary embodiment, the heat conducting layer 6 is a longitudinal heat conducting layer, which can conduct heat on the finger longitudinally to the plurality of identification elements 100, while barely conduct any heat laterally, thereby reducing heat loss and increasing sensitivity and accuracy of fingerprint identification. For example, the heat conducting layer 6 is made of a carbon nanotube composite. As a one-dimensional nanomaterial, carbon nanotube is light in weight, and its hexagonal structure has a perfect connection and many extraordinary mechanical, electrical and chemical properties, among which the most remarkable thermal property is the thermal conductivity. According to theoretic prediction, the thermal conductivity of carbon nanotube might probably be greater than diamonds and become the material with the highest thermal conductivity in the world. Thus making the heat conducting layer by a carbon nanotube composite is desirable.

As shown in FIG. 2, the heating conducting layer 6 has a plurality of parallel cylindrical units 61, each of the plurality of parallel cylindrical units 61 extending in a longitudinal direction of the plurality of identification elements 100. The cylindrical units 61 of the heat conducting layer 6 can be made by laser cutting or chemical etching. The plurality of parallel and longitudinally extending cylindrical units 61 can effectively conduct heat on the finger to the plurality of identification elements 100, while conducting no heat laterally, thereby minimizing heat loss.

It shall be noted that although the cylindrical units 61 are shown in FIG. 2 as being corresponding to the first identification unit 101 and the second identification unit 102 in a one-to-one manner, this is merely schematic. In some embodiments, each first identification unit and/or each second identification unit may be corresponding to a plurality of cylindrical units, or at least some of the first identification units and/or second identification units may be corresponding to no cylindrical unit at all.

Optionally, the fingerprint identification apparatus further comprises a protection layer 7 arranged above the heat conducting layer 6. The protection layer 7 is configured to protect the heat conducting layer 6 thereunder and should have good heat conducting property. For example, the protection layer 7 can be made of tempered glass or polymethyl methacrylate.

Figure 3:
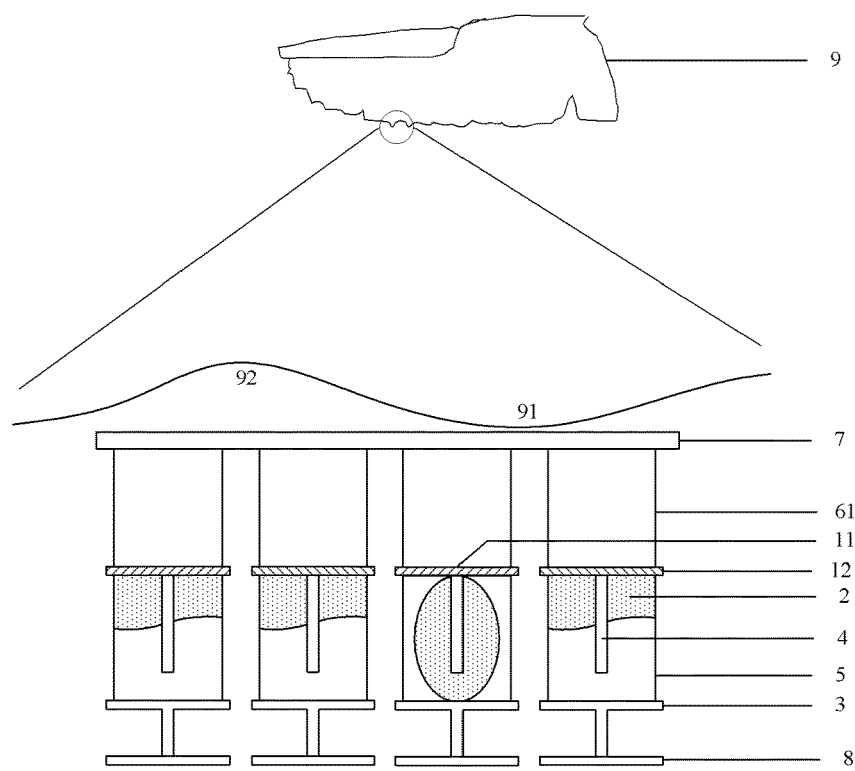
FIG. 3 schematically illustrates a distribution of electrically conductive droplets in a fingerprint identification apparatus according to an embodiment of the present disclosure when an ambient temperature is lower than a temperature of a ridge of a finger and the finger contacts the fingerprint identification apparatus.

FIG. 3 schematically illustrates a distribution of electrically conductive droplets in a fingerprint identification apparatus according to an embodiment of the present disclosure when an ambient temperature is lower than a temperature of a ridge of a finger and the finger contacts the fingerprint identification apparatus. Electrical signals are applied to the upper electrodes 4 of the identification element 100. Since the ambient temperature is lower than the temperature T of the ridge of the finger, the temperature of the ridge 91 of the finger 9 is higher than the temperature of the valley 92 of the finger 9. In this case, when the finger 9 contacts the fingerprint identification apparatus, the first temperature sensitive hydrophilic-hydrophobic conversion layer 11 in the first identification unit 101 of the identification element 100 contacting the ridge 91 of the finger has a temperature higher than the corresponding critical conversion temperature T1 and thus converts from being hydrophilic into being hydrophobic. The corresponding electrically conductive droplet 2 contacts the first temperature sensitive hydrophilic-hydrophobic conversion layer 11 with a smallest possible area, thereby electrically coupling the upper electrode 4 to the lower electrode 3. As a result, an electrical signal is detected on the corresponding lower electrode 3. In contrast, the first temperature sensitive hydrophilic-hydrophobic conversion layer 11 in the first identification unit 101 of the identification element 100 contacting the valley 92 of the finger 9 has a temperature lower than the corresponding critical conversion temperature T1 and thus remains to be hydrophilic. As a result, no electrical signal is detected on the corresponding lower electrode 3. On the other hand, either contacting the ridge 91 or the valley 92 of the finger 9, the second temperature sensitive hydrophilic-hydrophobic conversion layer 12 in the second identification unit 102 has a temperature lower than the corresponding critical conversion temperature T2, so the second temperature sensitive hydrophilic-hydrophobic conversion layer 12 remains to be hydrophilic. As a result, no electrical signal is detected on the corresponding lower electrode 3.

Figure 4:
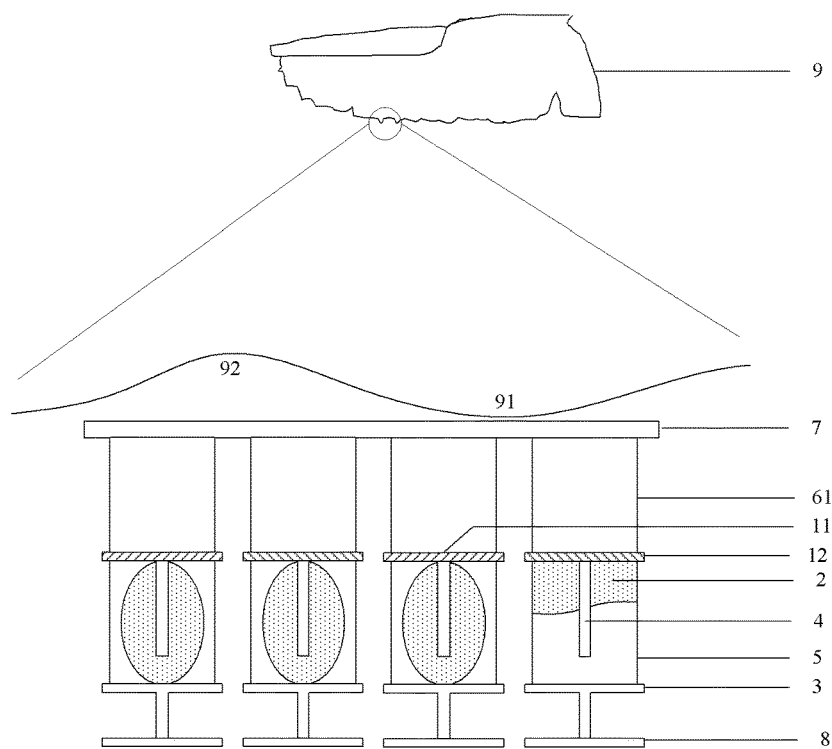
FIG. 4 schematically illustrates a distribution of electrically conductive droplets in a fingerprint identification apparatus according to an embodiment of the present disclosure when an ambient temperature is higher than a temperature of a ridge of a finger and the finger contacts the fingerprint identification apparatus.

FIG. 4 schematically illustrates a distribution of electrically conductive droplets in a fingerprint identification apparatus according to an embodiment of the present disclosure when an ambient temperature is higher than a temperature of a ridge of a finger and the finger contacts the fingerprint identification apparatus. Electrical signals are applied to the upper electrodes 4 of the identification element 100. Since the ambient temperature is higher than the temperature T of the ridge of the finger, the temperature of the ridge 91 of the finger 9 is lower than the temperature of the valley 92 of the finger 9. In this case, when the finger 9 contacts the fingerprint identification apparatus, the second temperature sensitive hydrophilic-hydrophobic conversion layer 12 in the second identification unit 102 of the identification element 100 contacting the valley 92 of the finger has a temperature higher than the corresponding critical conversion temperature T2 and thus converts from being hydrophilic into being hydrophobic. The corresponding electrically conductive droplet 2 contacts the second temperature sensitive hydrophilic-hydrophobic conversion layer 12 with a smallest possible area, thereby electrically coupling the upper electrode 4 to the lower electrode 3. As a result, an electrical signal is detected on the corresponding lower electrode 3. In contrast, the second temperature sensitive hydrophilic-hydrophobic conversion layer 12 in the second identification unit 102 of the identification element 100 contacting the ridge 91 of the finger 9 has a temperature lower than the corresponding critical conversion temperature T2 and thus remains to be hydrophilic. As a result, no electrical signal is detected on the corresponding lower electrode 3. On the other hand, either contacting the ridge 91 or the valley 92 of the finger 9, the temperature of the first temperature sensitive hydrophilic-hydrophobic conversion layer 11 in the first identification unit 101 is higher than the corresponding critical conversion temperature T1, so the first temperature sensitive hydrophilic-hydrophobic conversion layer 11 remains to be hydrophobic. As a result, an electrical signal is detected on the corresponding lower electrode 3.

Therefore, by detecting presence and absence of electrical signals on the lower electrodes 3 of the first identification unit 101 and the second identification unit 102 in each identification element 100, it can be determined whether a fingerprint feature contacting the identification element 100 is a ridge 91 or a value 92, thereby realizing fingerprint identification. Specifically, when electrical signals are present or absent on the lower electrodes 3 of both the first identification unit 101 and the second identification unit 102, a valley 92 of the fingerprint is detected. On the contrary, when electrical signals are present on the lower electrode 3 of the first identification unit 101 but absent on the lower electrode 3 of the second identification unit 102, a ridge 91 of the fingerprint is detected.

An embodiment of the present disclosure further provides a display device, with the fingerprint identification apparatus as shown in FIG. 2 integrated thereinto. In such a display device, the used fingerprint identification apparatus detects fingerprints by means of the property that the hydrophilicity and hydrophobicity of a temperature sensitive hydrophilic-hydrophobic conversion layer is related to the temperature, so the defect that a capacitive fingerprint identification apparatus cannot detect fingerprints through a glass plate on a surface of the display device is overcome. The fingerprint identification apparatus can be integrated in any position of the display device without the need to provide a separate fingerprint identification region on an edge of the display device, thereby improving accuracy of fingerprint identification and realizing narrow frame and miniaturization of the display device.

An embodiment of the present disclosure provides a method for manufacturing a fingerprint identification apparatus. The method comprises: providing a plurality of identification elements, each of the plurality of identification elements comprising a first identification unit and a second identification unit. The first identification unit comprises an electrically conductive droplet sandwiched between a first temperature sensitive hydrophilic-hydrophobic conversion layer and a lower electrode and enclosed by a sealing layer, and the second identification unit comprises an electrically conductive droplet sandwiched between a second temperature sensitive hydrophilic-hydrophobic conversion layer and a lower electrode and enclosed by the sealing layer. Upper electrodes of the first identification unit and the second identification unit are at least partially immersed in the electrically conductive droplets and are not in contact with lower electrodes. The first temperature sensitive hydrophilic-hydrophobic conversion layer and/or the second temperature sensitive hydrophilic-hydrophobic conversion layer are formed by the steps of providing a substrate; forming a plurality of grooves by patterning on a surface of the substrate; forming a cross-linking grafting film on the surface of the substrate formed with the plurality of grooves. The patterning process may include an etching process, and the cross-linking grafting film can be formed by a ultraviolet grafting technique.

The concept of the present disclosure can be widely applied to any system having a display function, including a desktop computer, a laptop computer, a mobile phone, a tablet computer, etc. In addition, although several embodiments have been described in detail herein, other modifications are possible. For example, other components than those described herein can be added to or removed from the described system. Other embodiments may fall within the scope of the present disclosure. Under the teaching of the present disclosure, those skilled in the art can realize many variations and modifications without departing from the spirit and scope of the present disclosure.

The invention claimed is:

1. A fingerprint identification apparatus, comprising:
a plurality of identification elements, each of the plurality of identification elements comprising a first identification unit,
wherein,
the first identification unit comprises a first temperature sensitive hydrophilic/hydrophobic conversion layer, a lower electrode, a sealing layer, an electrically conductive droplet sandwiched between the first temperature sensitive hydrophilic-hydrophobic conversion layer and the lower electrode and enclosed by the sealing layer, and an upper electrode that is at least partially immersed in the electrically conductive droplet and is not in direct contact with the lower electrode,
the first identification units are configured in such a way that when an ambient temperature is lower than a temperature of a ridge of a finger, in a first identification unit contacting the ridge of the finger, the first temperature sensitive hydrophilic-hydrophobic conversion layer converts from being hydrophilic into being hydrophobic, and the upper electrode is electrically coupled to the lower electrode via the first temperature sensitive hydrophilic-hydrophobic conversion layer; in a first identification unit contacting a valley of the finger, the first temperature sensitive hydrophilic-hydrophobic conversion layer remains to be hydrophilic, and the upper electrode is electrically isolated from the lower electrode.

2. The fingerprint identification apparatus according to claim 1, wherein each identification element further comprises a second identification unit, and the second identification unit comprises a second temperature sensitive hydrophilic/hydrophobic conversion layer, a lower electrode, the sealing layer, an electrically conductive droplet sandwiched between the second temperature sensitive hydrophilic-hydrophobic conversion layer and the lower electrode and enclosed by the sealing layer, and an upper electrode that is at least partially immersed in the electrically conductive droplet and is not in direct contact with the lower electrode,
the second identification units are configured in such a way that when the ambient temperature is higher than the temperature of the ridge of the finger, in a second identification unit contacting the valley of the finger, the second temperature sensitive hydrophilic-hydrophobic conversion layer converts from being hydrophilic into being hydrophobic, and the upper electrode is electrically coupled to the lower electrode; in a second identification unit contacting the ridge of the finger, the second temperature sensitive hydrophilic-hydrophobic conversion layer remains to be hydrophilic, and the upper electrode is electrically isolated from the lower electrode.

3. The fingerprint identification apparatus according to claim 2, wherein a hydrophilic-hydrophobic conversion temperature of the first temperature sensitive hydrophilic-hydrophobic conversion layer is $T_1$, and a hydrophilic-hydrophobic conversion temperature of the second temperature sensitive hydrophilic-hydrophobic conversion layer is $T_2$, the temperature of the ridge of the finger is T, an absolute value of a difference between temperatures of the ridge and valley of the finger is $\tau$, and $T-\tau < T_1 < T < T_2 < T+\tau$.

4. The fingerprint identification apparatus according to claim 3, wherein $\tau$ is 0.1° C.

5. The fingerprint identification apparatus according to claim 2, wherein when at least one of the first temperature sensitive hydrophilic-hydrophobic conversion layer and the second temperature sensitive hydrophilic-hydrophobic conversion layer converts from being hydrophilic into being hydrophobic, a contact angle with the electrically conductive droplet increases from a range of 0°-60° to a range of 100°-150°.

6. The fingerprint identification apparatus according to claim 2, wherein at least one of the first temperature sensitive hydrophilic-hydrophobic conversion layer and the second temperature sensitive hydrophilic-hydrophobic conversion layer comprises a substrate and a cross-linking grafting film on the substrate.

7. The fingerprint identification apparatus according to claim 6, wherein the substrate has a plurality of grooves.

8. The fingerprint identification apparatus according to claim 7, wherein the grooves have a spacing smaller than or equal to 10 μm therebetween.

9. The fingerprint identification apparatus according to claim 6, wherein the cross-linking grafting film of the first temperature sensitive hydrophilic-hydrophobic conversion layer comprises polyisopropylacrylamide.

10. The fingerprint identification apparatus according to claim 6, wherein the cross-linking grafting film of the second temperature sensitive hydrophilic-hydrophobic conversion layer comprises a copolymer of N-ethyl acrylamide and N-isopropylacrylamide.

11. The fingerprint identification apparatus according to claim 1, wherein the sealing layer is a hydrophobic sealing layer.

12. The fingerprint identification apparatus according to claim 1, wherein the sealing layer is made of organic glass.

13. The fingerprint identification apparatus according to claim 1, wherein the fingerprint identification apparatus further comprises a signal processing circuit, each identification element being electrically coupled to said signal processing circuit.

14. The fingerprint identification apparatus according to claim 1, wherein the fingerprint identification apparatus further comprises a heat conducting layer arranged above the identification elements.

15. The fingerprint identification apparatus according to claim 14, wherein the heat conducting layer is made of a carbon nanotube composite.

16. The fingerprint identification apparatus according to claim 14, wherein the heat conducting layer comprises a plurality of parallel cylindrical units, each of the plurality of parallel cylindrical units extending in a direction perpendicular to a contact interface between the fingerprint and the fingerprint identification apparatus.

17. The fingerprint identification apparatus according to claim 14, wherein the fingerprint identification apparatus further comprises a protection layer arranged above the heat conducting layer.

18. The fingerprint identification apparatus according to claim 17, wherein said protection layer is made of tempered glass.

19. A display device, comprising the fingerprint identification apparatus according to claim 1.

20. The fingerprint identification apparatus according to claim 17, wherein said protection layer is made of polymethyl methacrylate.

* * * * *